(12) United States Patent
Peck et al.

(10) Patent No.: US 11,559,792 B2
(45) Date of Patent: Jan. 24, 2023

(54) ZINC MANGANESE-IRON SPINEL WITH AN ALKALI METAL STABILIZER AS AN OXYGEN STORAGE MATERIAL RESISTANT TO RICH/LEAN AGING

(71) Applicant: Toyota Motor Engineering & Manufacturing North America, Inc., Plano, TX (US)

(72) Inventors: Torin C. Peck, Ann Arbor, MI (US); Benjamin A. Grayson, Whitmore Lake, MI (US); Blake A. Graham, Ann Arbor, MI (US); Charles Alexander Roberts, Farmington Hills, MI (US); Krishna Gunugunuri, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 28 days.

(21) Appl. No.: 17/206,371

(22) Filed: Mar. 19, 2021

(65) Prior Publication Data

US 2022/0297097 A1    Sep. 22, 2022

(51) Int. Cl.
*B01J 23/889* (2006.01)
*B01J 23/00* (2006.01)
(Continued)

(52) U.S. Cl.
CPC ......... *B01J 23/8892* (2013.01); *B01J 23/005* (2013.01); *B01J 35/002* (2013.01); *B01J 37/08* (2013.01); *F01N 3/2807* (2013.01)

(58) Field of Classification Search
CPC .... B01J 23/8892; B01J 23/005; B01J 35/002; B01J 37/08; B01J 23/06; B01J 23/34;
(Continued)

(56) References Cited

U.S. PATENT DOCUMENTS

| | | | | | |
|---|---|---|---|---|---|
| 5,876,681 | A | * | 3/1999 | Barthe | B01D 53/9418 502/514 |
| 6,046,130 | A | * | 4/2000 | Narbeshuber | B01J 23/005 502/328 |

(Continued)

OTHER PUBLICATIONS

Dinesh Varshney et al., "Structural and vibfational properties of ZnxMn1—xFe2O4 (x=0.0, 0.25, 0.50, 0.75, 1.0) mixed ferrites." Materials Chemistry and Physics 131, pp. 413-419. (Year: 2011).*

(Continued)

*Primary Examiner* — Patricia L. Hailey
(74) *Attorney, Agent, or Firm* — Christopher G. Darrow; Darrow Mustafa PC (57) ABSTRACT

An oxygen storage material (OSM) includes a zinc manganese iron oxide (ZMF) and an alkali metal base on the ZMF surface. The ZMF has a spinel structure. The alkali metal containing ZMF can be formed to have a weight percent of alkali metal up to about two percent. The alkali metal carbonate is retained on the ZMF surface upon heating to a temperature greater than 1,000° C. and stabilizes the ZMF to the cycling of an oxygen rich and oxygen lean atmosphere. The OSM additionally catalyzes the oxidation of hydrocarbons and CO and catalyzes the reduction of $NO_x$ for use in catalytic converters.

20 Claims, 7 Drawing Sheets

(51) Int. Cl.
   *F01N 3/28* (2006.01)
   *B01J 37/08* (2006.01)
   *B01J 35/00* (2006.01)

(58) Field of Classification Search
   CPC .. B01J 27/232; F01N 3/2807; F01N 2250/12; F01N 2570/16; F01N 3/0864; B01D 53/94; B01D 2255/405; B01D 2255/908; B01D 2257/104; B01D 2258/012; B01D 2258/014
   USPC .......................................... 502/183, 329, 524
   See application file for complete search history.

(56) References Cited

U.S. PATENT DOCUMENTS

| | | | |
|---|---|---|---|
| 6,395,244 B1* | 5/2002 | Hartweg | B01D 53/9422 423/247 |
| 6,416,682 B1* | 7/2002 | Krijgsman | C04B 35/00 252/62.62 |
| 8,853,121 B1 | 10/2014 | Nazarpoor et al. | |
| 9,216,409 B2 | 12/2015 | Nazarpoor et al. | |
| 11,311,861 B2* | 4/2022 | Peck | F01N 3/101 |
| 2016/0312730 A1* | 10/2016 | Launois | F02D 41/1475 |
| 2018/0339268 A1 | 11/2018 | Gunugunuri et al. | |
| 2020/0325810 A1 | 10/2020 | Gunugunuri et al. | |
| 2021/0316281 A1* | 10/2021 | Peck | F01N 3/0864 |

OTHER PUBLICATIONS

Simi Debnath et al., "Study of the optical properties of Zn doped Mn spinel ferrite nanocrystals shows multiple emission peaks in the visible range—a promising soft ferrite nanomaterial for deep blue LED." Journal of Molecular Structure 1199, pp. 1-7. (Year: 2019).*

Patil, R.P. et al. "Synthesis, structural and magnetic properties of different metal ion substituted nanocrystalline zinc ferrite" Res. Phys., 3, pp. 129-133 (2013).

Peck, T.C. et al., "Contrasting Effects of Potassium Addition on M3O4 (M=Co, Fe, and Mn) Oxides During Direct NO Decomposition Catalysis," Catalysts, 10 (5) (2020) 22 pages.

* cited by examiner

ZINC MANGANESE-IRON SPINEL WITH AN ALKALI METAL STABILIZER AS AN OXYGEN STORAGE MATERIAL RESISTANT TO RICH/LEAN AGING

TECHNICAL FIELD

The present disclosure generally relates to catalysts for treatment of exhaust gases.

BACKGROUND

Internal combustion engines generate small amounts of nitrogen oxides and carbon monoxide and leave unconverted or partially oxidized hydrocarbons. These gases are toxic and must be removed from the exhaust stream for the betterment of the environment. A removal that involves the catalytic conversion to low toxicity gases, such as nitrogen and carbon dioxide, is preferred.

Three-way catalysts (TWCs) are increasingly used for removal of these toxic gases, where active platinum group metal (PGM) catalytic sites are on an alumina support with metal oxide promotors for oxygen storage and release during fluctuations in the oxidative and reductive atmospheres that exists during the running of an engine. Many of the oxygen storage materials (OSM) are based on $CeO_2$ (ceria) and $CeO_2$—$ZrO_2$ solid solutions; the latter having superior oxygen storage capacity (OSC) and thermal stability than the former. This requirement of PGM and rare earth metals, especially ceria, in these catalytic systems has become increasingly more expensive to achieve an acceptable catalyst with the stricter requirements imposed on emissions. The inherent mass efficiency of a 1:1 Ce:Zr composition is low, as the $Ce^{+3}$ to $Ce^{+4}$ oxidation that occurs to store oxygen has an unfortunately large 4:1 Ce:O atom ratio for the transformation.

Accordingly, to realize superior OSC material impact, the use of metal oxides using more abundant metals that are stable to very high temperatures (over 1,000° C.) and have a more desirable metal:oxygen ratio for storage becomes an important target of development. Also, a rare earth metal free OSM that catalyzes the reduction of $NO_x$ and the oxidation of hydrocarbons and CO is desirable.

SUMMARY

Disclosed, in various non-limiting embodiments, is an oxygen storage material (OSM) that includes a manganese-iron oxide in a spinel structure of the formula $Mn_xFe_{3-x}O_4$ that contains zinc. The Zn-doping stabilizes the composition at temperatures in excess of about 1,000° C. The zinc manganese iron oxide (ZMF) $Zn_xMn_yFe_{3-x-y}O_4$ allows a high activity for the reduction of $NO_x$ and the oxidation of CO and hydrocarbons. Furthermore, the use of $Na_2CO_3$, or other alkali metal carbonates, as an additional component, increases the oxygen storage capacity (OSC) and the structural stability of the ZMF while cycled between lean and rich combustion conditions. The OSM includes up to about two weight percent sodium.

One embodiment, provided herein, is a method to prepare the $Zn_xMn_yFe_{3-x-y}O_4$. Beginning with an aqueous solution of manganese iron, and zinc nitrates or other soluble salts of these metal ions, a precipitation with sodium carbonate, or other alkali metal carbonate or any other alkali metal base, yields a spinel Zn-doped manganese iron oxide that contains some alkali metal. The amount of alkali metal carbonate with the OSM can be increased as desired by a wet impregnation of the ZMF spinel precipitate to increase the alkali metal content to about one percent or more. The alkali metal containing ZMF is readily calcined and heat aged to produce an OSM that can be pelletized for inclusion in a catalytic converter.

In another embodiment, provided herein, a catalytic convertor with superior OSC and light-off temperature (T50) includes an OSM that is an alkali metal containing ZMF spinel for storage and release of oxygen and for $NO_x$ reduction and CO and hydrocarbon oxidation. In this manner, a catalytic converter that includes the alkali metal containing ZMF spinel can be constructed at a lower cost yet provide higher performance.

These and other features of the OSM and its preparation will become apparent from the following detailed description when read in conjunction with the figures and examples, which are exemplary, not limiting.

BRIEF DESCRIPTION OF THE DRAWINGS

For a better understanding of the processes and devices displaying oxygen storage capabilities, with regard to the particular variations and examples discussed herein, reference is made to the accompanying figures, in which.

It should be noted that the graphs, plots, and other figures set forth herein are intended to exemplify the general characteristics of the methods, compositions and devices among those of the present technology, for the purpose of the description of certain aspects. The figures may not precisely reflect the characteristics of any given aspect and are not necessarily intended to define or limit specific embodiments within the scope of this technology.

DETAILED DESCRIPTION

The present disclosure provides an oxygen storage material (OSM) that is an alkali metal containing spinel zinc-doped manganese iron oxide that provides superior oxygen storage and is stable at temperatures greater than 1,000° C. The OSM has a high oxygen storage capacity (OSC), which allows improved fuel economy for vehicles using an internal combustion engine and a stoichiometric (3-way) catalyst, where high purification of the exhaust stream by reducing nitrogen oxides ($NO_x$), unburned hydrocarbons, and carbon monoxide (CO) is achieved. The OSM is stable at elevated temperatures when subject to exhaust streams from internal combustion engines while cycling between lean (high air-fuel ratio) and rich (low air-fuel ratio) conditions. The OSM is a manganese iron oxide having a spinel structure of the formula $Mn_xFe_{3-x}O_4$, where portions of the Mn or Fe ions are replaced by Zn ions. As both Mn and Fe can exist in multiple valence states and phases, based f the stoichiometry of the oxidation reactions that incorporate oxygen for storage, a higher oxygen uptake per metal ion is achieved relative to state-of-the-art cerium zirconium oxide ($CZO_x$) OSMs. It was discovered that by including a zinc dopant, the high temperature stability increases, which allows the use of these manganese iron oxides at temperatures greater than 1,000° C., as required for current catalytic converters. According to various embodiments, the Zn-doped manganese iron oxides (ZMF) are spinel oxides having the formula $Zn_xMn_{0.5}Fe_{2.5-x}O_4$, where $0.01 \leq x \leq 0.9$. It was also discovered that by using alkali metal impregnation, the spinel structure is fully retained after exposure to the high temperatures.

These Zn-doped manganese iron oxide (ZMF) spinel oxides are particularly advantageous because their superior OSCs have a lower inherent cost, as these metals are all abundant, and can be procured locally in most places. They are also inexpensive when compared to the rare-earth OSMs prepared from cerium zirconium oxides. An additional advantage is that the stoichiometric oxygen uptake per metal ion for the ZMF, has a metal to oxygen uptake ratio of 3:2, which is significantly improved in comparison to $CZO_x$ OSMs, where the metal to oxygen uptake ratio is 4:1. This provides a potential for more efficient use of the metal, particularly with lean combustion mixtures.

Figure 1:
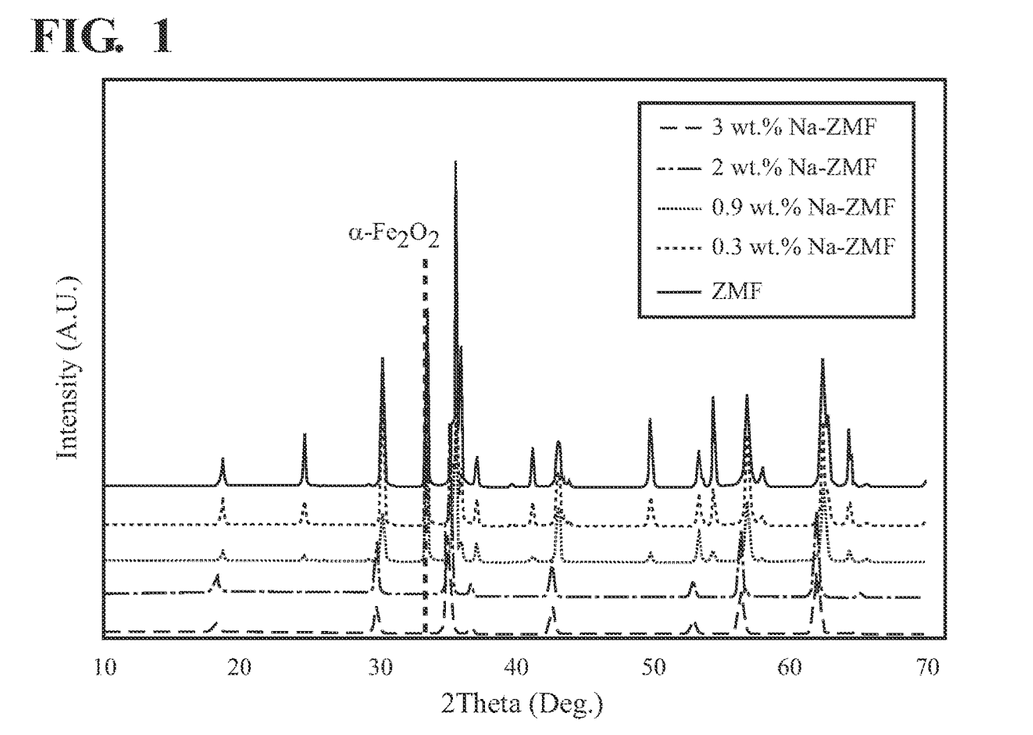
FIG. 1 shows X-Ray Diffraction (XRD) patterns for the zinc manganese iron oxide (ZMF) of the formula $Zn_{0.5}Mn_{0.5}Fe_2O_4$ with various sodium content, after air aging at 1,000° C. for five hours.
Figure 2A:
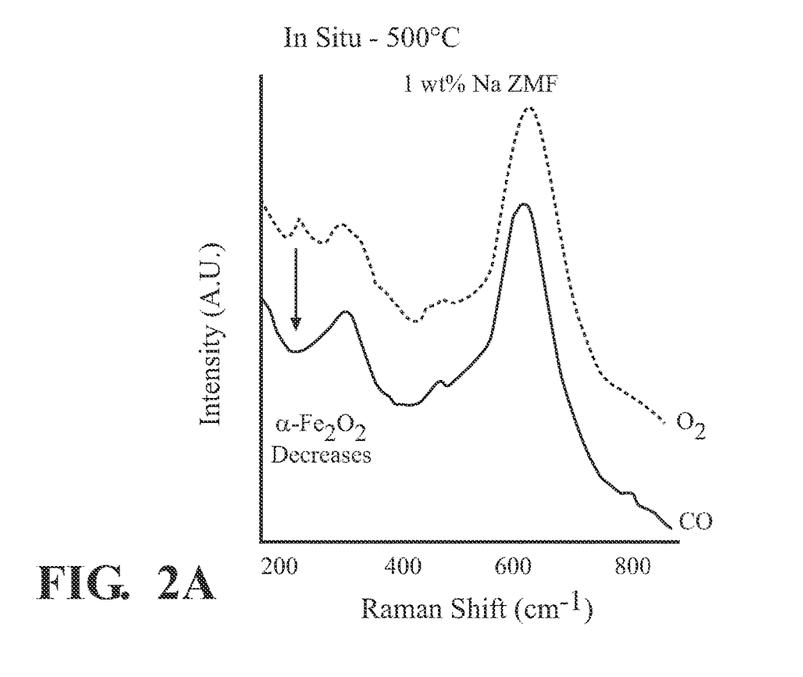
FIG. 2A shows Raman spectra of one weight percent sodium containing $Zn_{0.5}Mn_{0.5}Fe_2O_4$ after exposures to $O_2$ and CO, where the absorption indicating $\alpha$-$Fe_2O_3$ present upon oxidation and upon reduction, respectively.
Figure 2B:
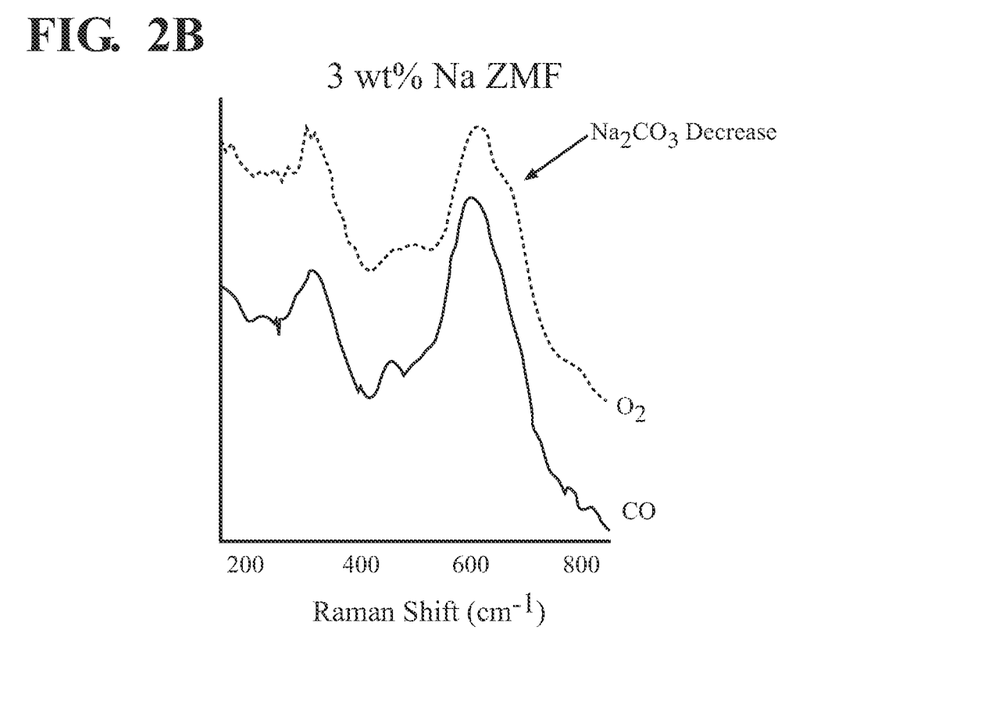
FIG. 2B shows Raman spectra of three weight percent sodium containing $Zn_{0.5}Mn_{0.5}Fe_2O_4$ after exposures to $O_2$ and CO, where no absorption is indicated for $\alpha$-$Fe_2O_3$ but where surface $Na_2CO_3$ is indicated.
Figure 3A:
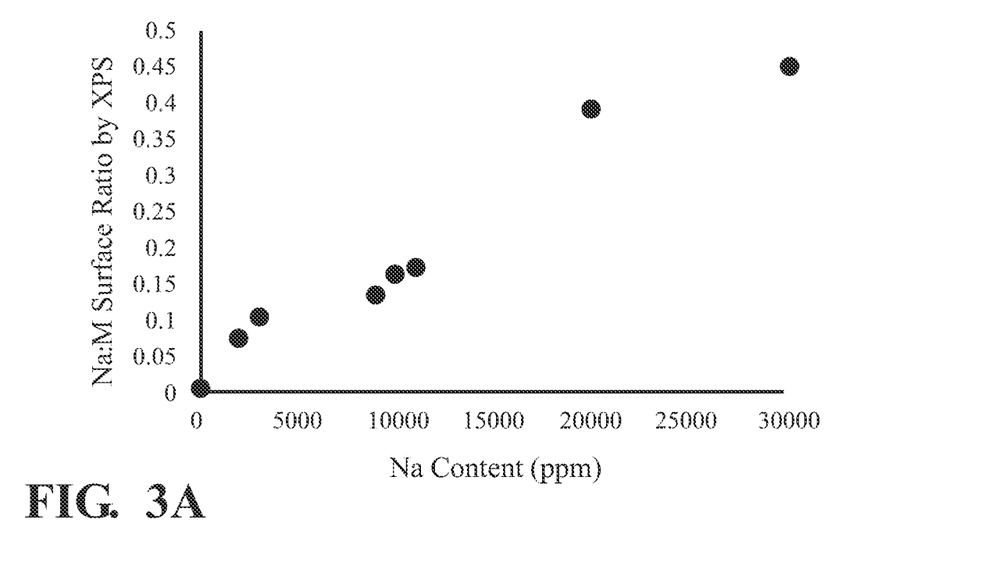
FIG. 3A shows a plot of the surface sodium to transition metal ratio (Na:M) for various Na contents from zero to three percent sodium for sodium containing $Zn_{0.5}Mn_{0.5}Fe_2O_4$.
Figure 3B:
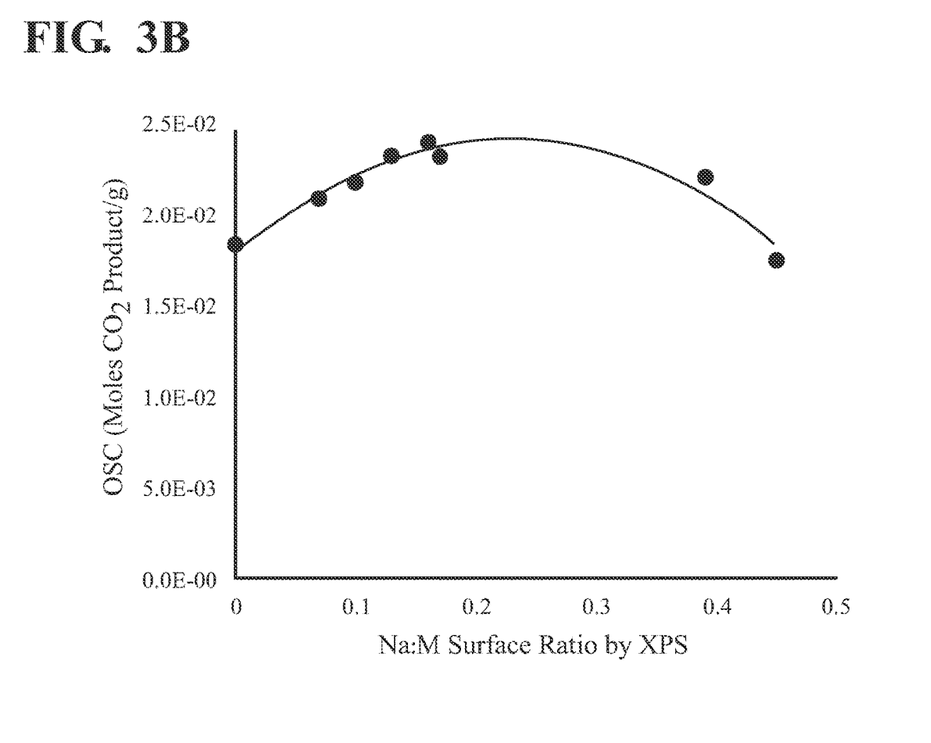
FIG. 3B shows a plot of the oxygen storage capacity (OSC) change for various Na:M surface ratios from the sodium content indicated in FIG. 3A that displays a maximum for the surface content of about one weight percent sodium on the $Zn_{0.5}Mn_{0.5}Fe_2O_4$.

The addition of alkali metal salts, such as their carbonates, provide improved performance to the ZMF. The structure of the ZMF is affected by the alkali metal concentration. As shown in FIG. 1 for the x-ray powder diffraction (XRD) patterns of sodium containing $Zn_{0.5}Mn_{0.5}Fe_2O_4$ after air aging for five hours at 1,000° C., an $\alpha$-$Fe_2O_3$ phase, at 2θ of about 33°, decreases in intensity with increasing Na content until no $\alpha$-$Fe_2O_3$ is observed at about two weight percent sodium. An excess of $Fe_2O_3$ can inhibit reversibility of the oxygen absorption and release, and the optimum alkali metal content for the retention of some $\alpha$-$Fe_2O_3$ is equivalent to about one weight percent sodium. As shown in FIG. 2A at one weight percent Na, the $\alpha$-$Fe_2O_3$ is observable and capable of reversible oxidation and reduction in $O_2$ and CO atmospheres. At three weight percent, as shown in FIG. 2B, surface $Na_2CO_3$ is detectable upon formation of the OSM, which appears to block redox reactions by surface Mn and Fe. As shown in FIG. 3A, the ratio of alkali metal to transition metal, as analyzed by X-ray photoelectron spectroscopy (XPS), increases almost linearly with sodium content through about three percent sodium. Yet the optimal OSC occurs at a sodium to transition metal ratio, as shown in FIG. 3B, of about one percent sodium content.

In one embodiment, a method is provided for the preparation of an alkali metal containing ZMF. The ZMF is constructed by the precipitation of the mixed metal oxide from a combination of water-soluble zinc, manganese, and iron salts. The water-soluble salts can be nitrates, halides, acetates, or soluble salts of any other anions that upon combination with an alkali metal carbonate solution precipitate the ZMF. The precipitation agent is an alkali metal base, for example, an alkali metal carbonate. Alkali metal hydroxides, or other alkali metal bases can be used as the precipitation reagent. After precipitation and washing, an alkali metal carbonate content imparts a stability to the ZMF, particularly under lean-rich cycling of the exhaust at high temperatures. The alkali metal content can be adjusted by infusing an alkali metal salt from aqueous solution into the ZMF precipitate.

Figure 4:
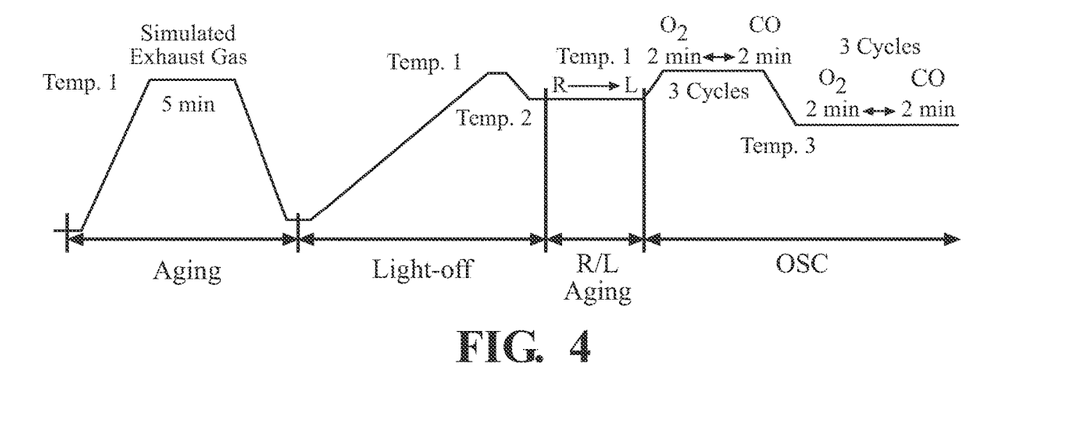
FIG. 4 shows a temperature profile imposed for aging and testing of the OSC after Rich/Lean Aging Cycles for alkali metal containing ZMFs.
Figure 5A:
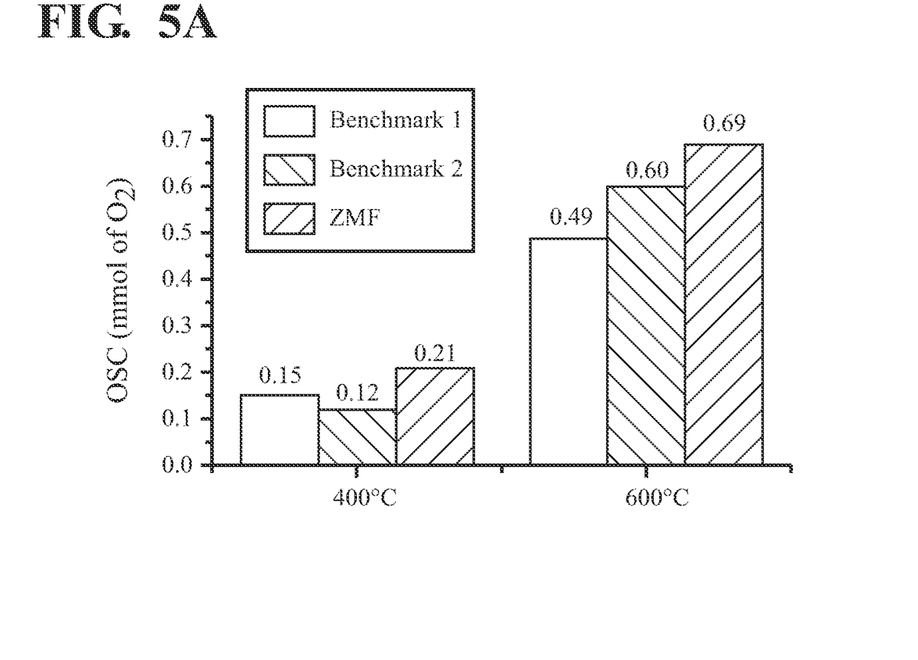
FIG. 5A shows bar graphs for the OSC of an alkali metal containing ZMF relative to two benchmark cerium zirconium oxide ($CZO_x$) OSMs at a low and a high temperature.
Figure 5B:
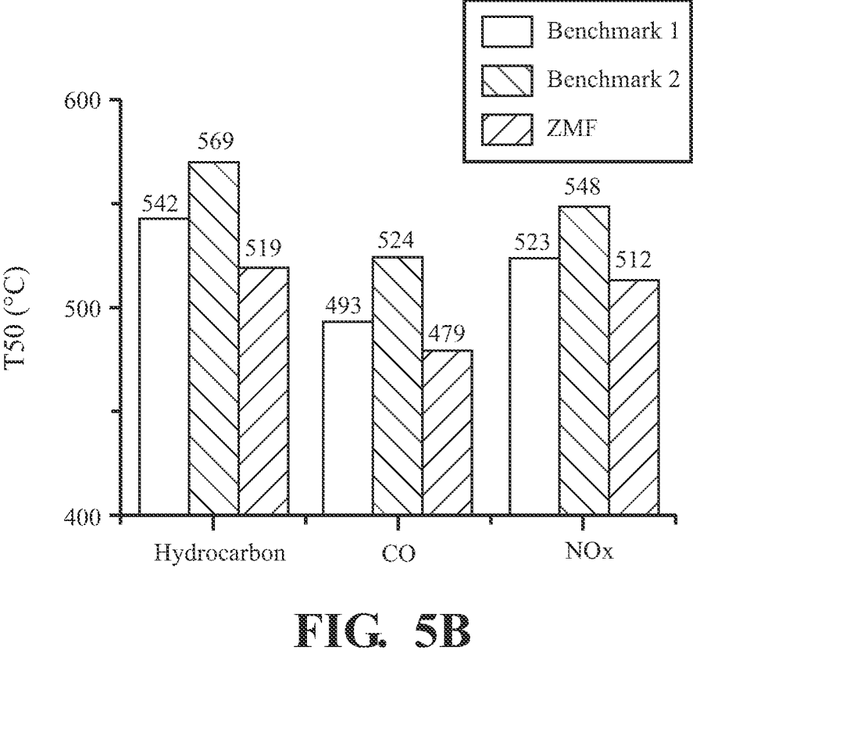
FIG. 5B shows bar graphs for the light-off temperature (T50) of an alkali metal containing ZMF relative to two benchmark cerium zirconium oxide ($CZO_x$) OSMs for consumption of hydrocarbons, carbon monoxide, and nitrogen oxides.

In another embodiment, a catalytic converter including the alkali metal containing ZMF is provided. The catalytic converter is well suited to oxygen storage under lean exhaust compositions but also to conversion of hydrocarbons and CO to $CO_2$ under rich compositions. For example, a ZMF combined with Pd on alumina and, for reference, $CZO_x$ combined with Pd on alumina were aged in alternating rich and lean atmospheres at 1,100° C., as indicated in FIG. 4, to simulate a catalytic converter. The resulting OSC and the light off temperature (T50), where 50 percent of the of the inlet concentration of CO is converted, for the ZMF, according to one embodiment, is superior to that of Pd with $CZO_x$ benchmarks, as shown in FIG. 5A and FIG. 5B.

Figure 6:
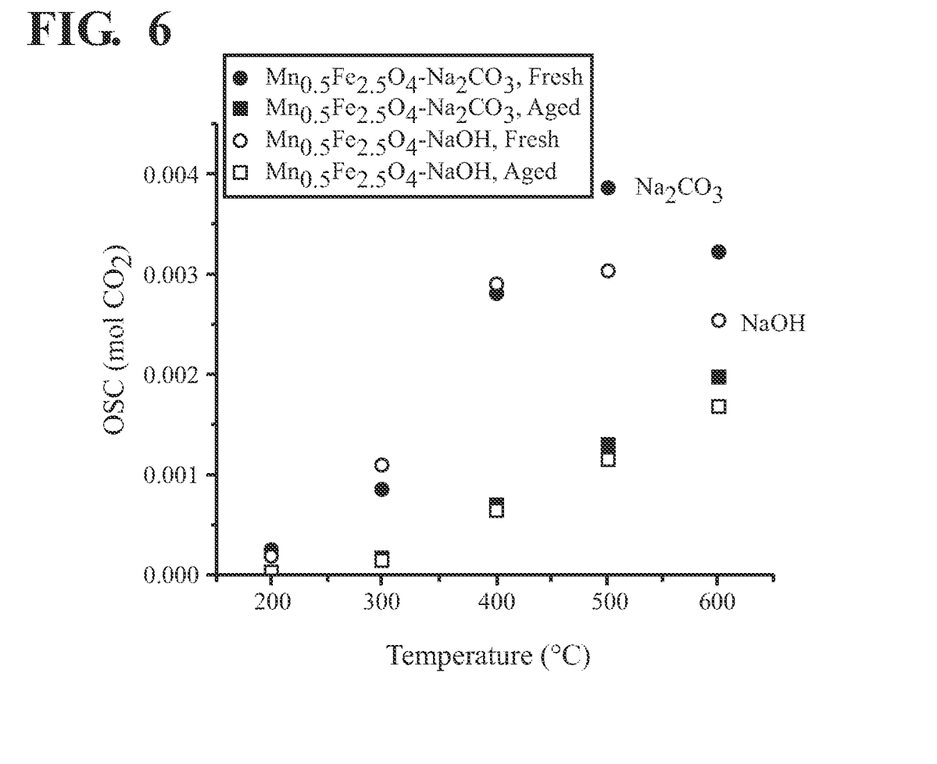
FIG. 6 shows a plot of the OSC as a function of temperature for fresh and aged manganese iron oxides prepared using sodium carbonate and sodium hydroxide as the precipitant.
Figure 7:
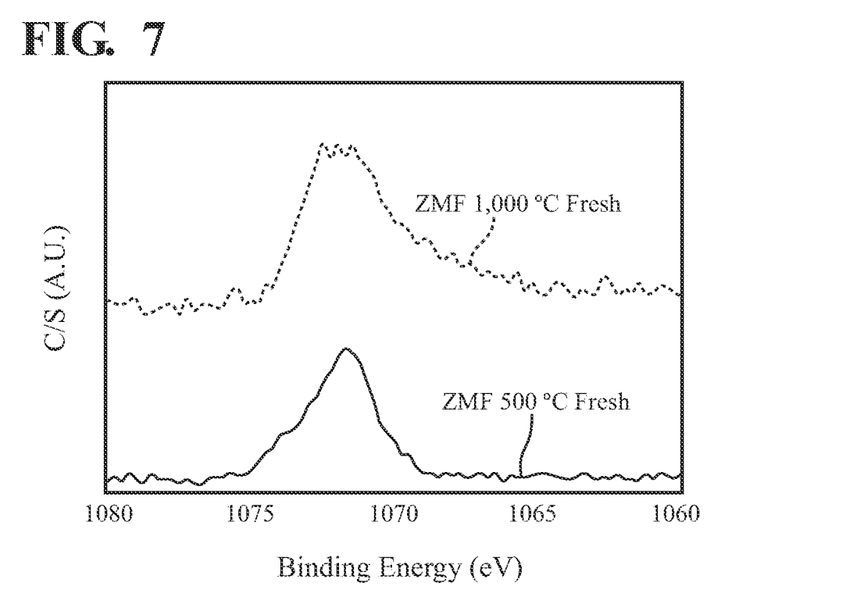
FIG. 7 shows Na 1s XPS (X-ray photoelectron spectroscopy) of fresh and 1000° C. air-aged $Zn_{0.5}Mn_{0.5}Fe_2O_4$.

The inclusion of the alkali metal carbonate, or other basic alkali metal salt, improves the high temperature stability and the OSC of the ZMF. The alkali metal can be Li, Na, K, Cs, Rb, or any combination thereof. The effectiveness of the alkali metal carbonate is better with the larger alkali metal rubidium, although robust OSMs can be prepared with smaller alkali metals, such as sodium. The content of the alkali ion in the ZMF is affected by the concentration of the carbonate in the precipitation process. Attaining levels above about one weight percent alkali metal can be difficult to achieve precisely by the precipitation during synthesis of the ZMF. The infusing of the alkali metal salt from aqueous solution into the precipitated ZMF allows a controlled increase in the alkali metal content to three percent or more. As shown in FIG. 6 for the preparation of sodium containing $Mn_{0.5}Fe_{2.5}O_4$, use of the carbonate as precipitation agent is more effective than the hydroxide for the achievement and retention of a high OSC. Nevertheless, using either sodium ion base, the retention of the alkali metal, as illustrated with Na in FIG. 7, at 1,000° C. for the ZMF, $Zn_{0.5}Mn_{0.5}Fe_2O_4$, is apparent from the XPS spectra of freshly calcined OSM and that aged at 1,000° C. Na1s XPS shows that Na is present after aging. A clear peak is observed before and after aging of the precipitated composition, indicating that alkali atoms in the composition remain, absent evidence of mobility or volatility that is often observed for sodium compounds at 1,000° C.

Figure 8A:
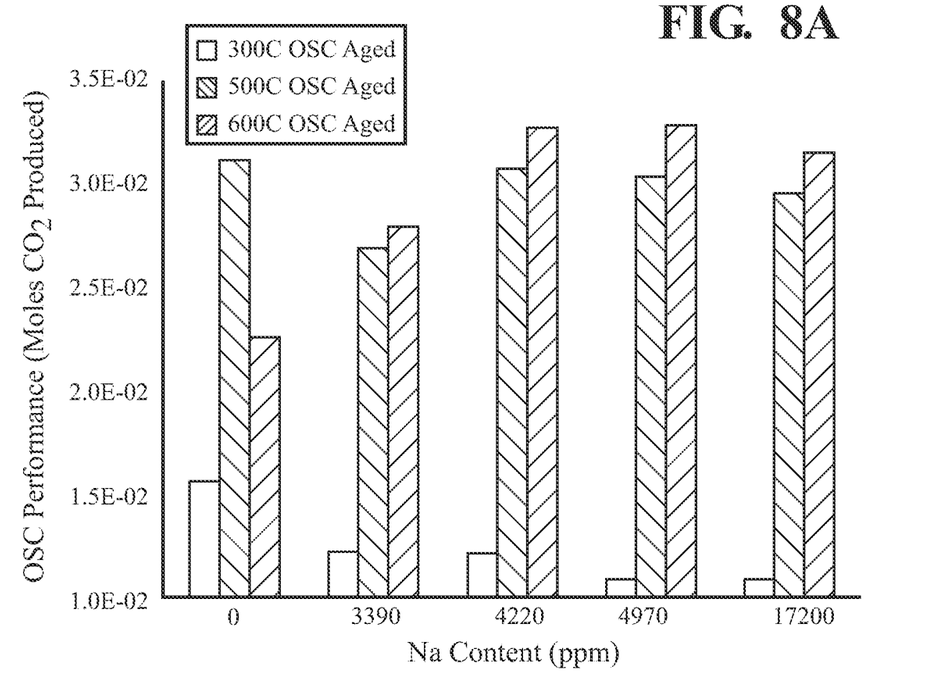
FIG. 8A shows bar graphs of the OSC vs Na content of fresh ZMF at various temperatures prepared by $Na_2CO_3$ precipitation.
Figure 8B:
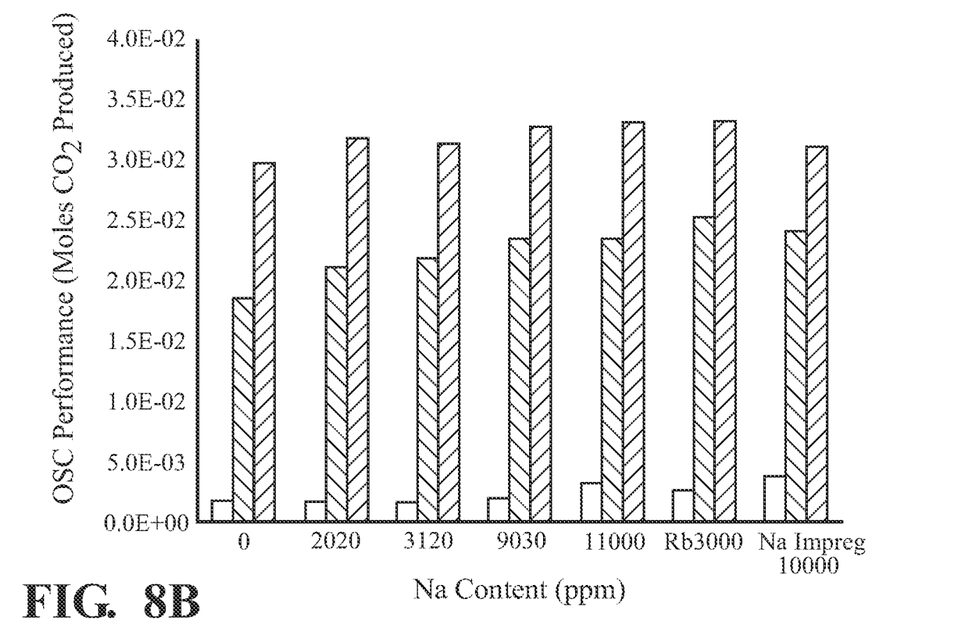
FIG. 8B shows bar graphs of the OSC vs Na content of 1,000° C. air-aged ZMF prepared by $Na_2CO_3$ precipitation with the inclusion of 0.3 wt. % Rb containing $Zn_{0.5}Mn_{0.5}Fe_2O_4$ and 1 wt. % Na impregnated $Zn_{0.5}Mn_{0.5}Fe_2O_4$.

The OSC of the Na containing ZMFs were analyzed as a function of temperature as produced and after aging at 1,000° C., as shown in FIG. 8A and FIG. 8B, respectively. Note that although the OSC diminishes at low temperatures upon aging, the OSC is similar or superior at higher temperatures than that of freshly prepared OSM. This clearly demonstrates advantages to the presence of the alkali metal carbonate to levels of about one weight percent of the OSM. The level of alkali metal of about 0.3 to about 2 weight percent. The ability of rubidium carbonate aged in air at 1,000° C. for five hours protects the OSM from high temperature damage in a manner similar to, and by some indications superior to, that of sodium carbonate, illustrates the effectiveness of other alkali metal carbonates. The retention of oxygen absorption and desorption capacity, combined with the alkali metal containing ZMF OSM's ability to treat CO, hydrocarbons, and $NO_x$, identifies these compositions as excellent materials for use in catalytic converters, while allowing a reduction in cost for the converter's manufacture.

EXAMPLES

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Preparation of OSMs

Figure 9:
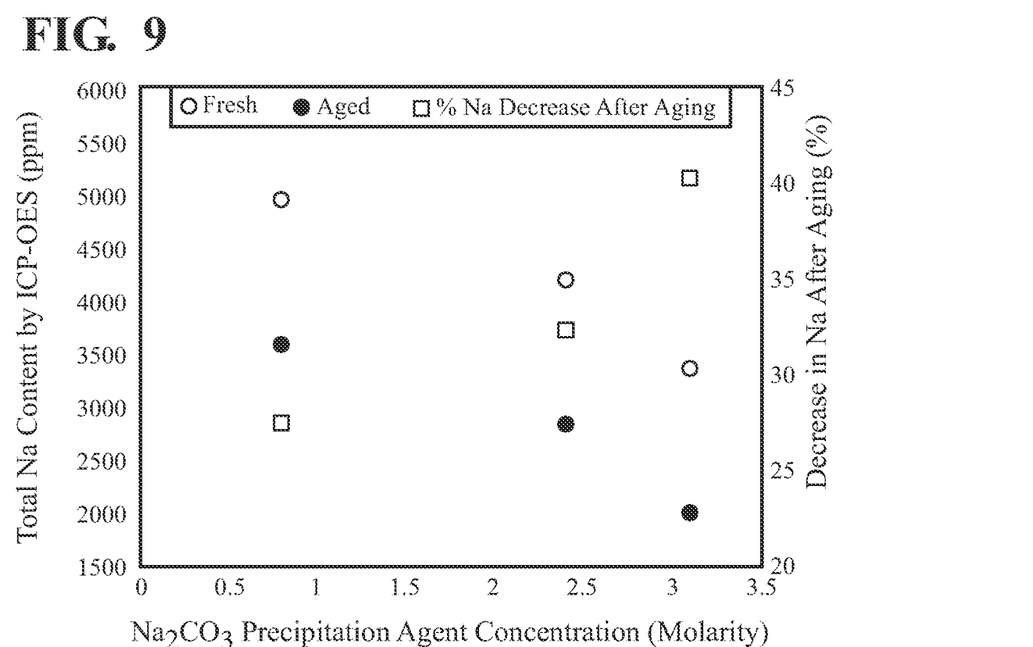
FIG. 9 shows a plot of the Na content (left axis) determined by ICP-OES for fresh and aged at 1,000° C. in air $Zn_{0.5}Mn_{0.5}Fe_2O_4$, and a plot of the decrease in Na content (right axis) from fresh to aged samples as a function of $Na_2CO_3$ concentrations used as precipitant in the ZMF preparation.
Figure 10:
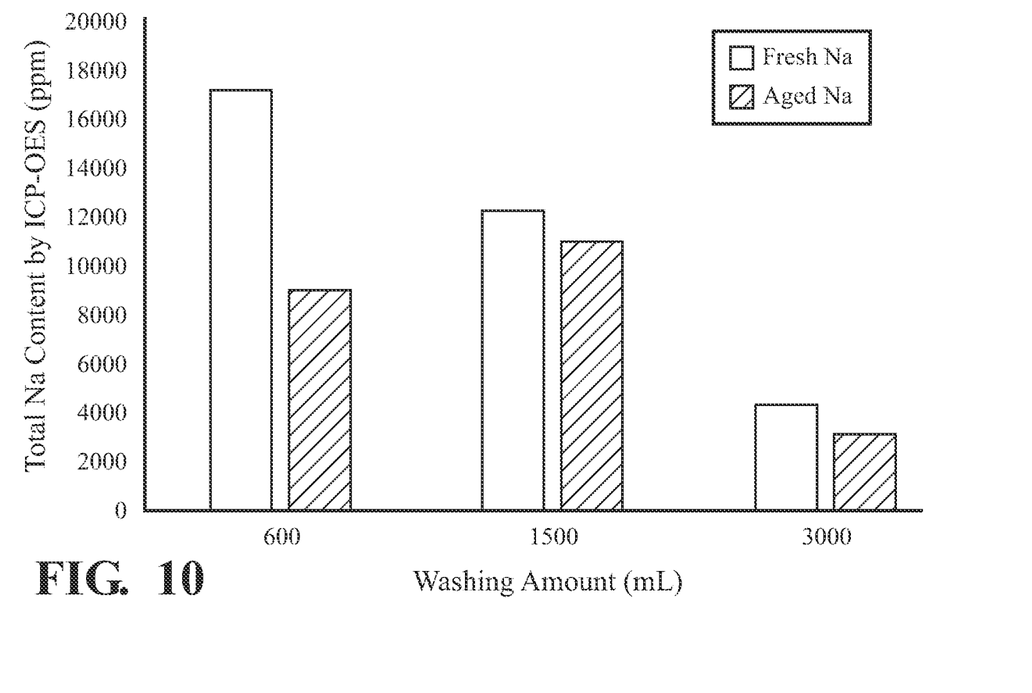
FIG. 10 shows bar graphs of the Na content determined by ICP-OES for fresh and aged at 1,000° C. in air $Zn_{0.5}Mn_{0.5}Fe_2O_4$ as a function of the volume of water used for washing after a common co-precipitation synthesis.

Materials of the composition $Mn_{0.5}Fe_{2.5}O_4$, and $Zn_xMn_{0.5}Fe_{2.5-x}O_4$ ($0.01 \le x \le 0.9$) were synthesized by a scalable co-precipitation process. Various stoichiometric quantities of high purity Mn, Fe(III), and Zn nitrates with Fe(II) chloride were dissolved in 400 mL of deionized water with magnetic stirring to yield the precursor solutions that formed five grams of the OSM. These precursor solutions were combined with 100 ml of an aqueous $Na_2CO_3$ solution that was varied in concentration from 0.8 M to 3.1 M. As illustrated in FIG. 9, the Na content of the precipitated OSM decreased with increasing sodium carbonate concentration, and the loss of sodium on thermal aging increased with precipitation solution concentration. Using a common ZMF the precipitated mass was washed with various quantities of deionized water. As shown in FIG. 10, the Na ion concentration reduced with the volume of water used. In all cases, the precipitate was dried at 120° C. for six to twelve hours, ground with an agate mortar and pestle to a fine powder, and calcined at 500° C. for two hours.

To increase the sodium ion content beyond that achieved upon precipitation and any washing, the precipitated materials were subjected to wet impregnation by $Na_2CO_3$ solution to yield sodium ion of about one to about three weight percent Na. After aging in air at 1000° C. for five hours, the ZMF materials were pressed into nine-micron pellets.

For preparation of compositions for analysis of OSC and T50 for applicability for use in a catalytic converter, the Na containing ZMF (4.9 g) as prepared above, was combined with Pd on alumina, which was formed from an aqueous solution having 0.1 g Pd combined with 5 g of $Al_2O_3$, followed by drying at 120° C., and firing at 500° C. For comparison, benchmark $CZO_x$ compositions were combined with the equivalent Pd on alumina in quantities and methods equivalent to that prepared with the ZMF sample.

Evaluation of OSMs

Approximately one gram of each pelletized material was evaluated for OSC using a Catalytic Convertor Automated Testing System, equipped with a MEXA 7100D Motor Exhaust Gas Analyzer (Horiba). Pellets were loaded in the reactor test piece between two pieces of inert quartz wool. The temperature was elevated to 200° C. within 5 minutes, and the OSM was exposed to five cycles of one percent oxygen, followed by two percent carbon monoxide while monitoring the carbon dioxide production during CO pulses, where the $CO_2$ production corresponds to the moles of oxygen stored by the material. The temperature was raised to 300, 400, 500, and 600° C. with the OSC evaluated at each temperature in the manner employed at 200° C. This OSM testing was performed using a Microactivity Reference System (Micromeritics), coupled with an FTIR detector (California Analytical Instruments) with 250 mg catalyst samples in a one-millimeter quartz tube that was heated to 200° C. under a ten percent O2 atmosphere for thirty minutes followed by exposure to five percent CO air for one hour. This cycle was repeated one time. Subsequently, OSMs were aged at 1,000° C. for five hours in air and re-evaluated their OSC by the method disclosed above.

X-Ray Diffraction patterns were collected of the 1,000° C. aged samples before and after OSC evaluation to identify the crystal structure(s) and material phase(s) present before and after use. X-ray Photoelectron Spectroscopy was performed in the Na1s envelope before and after aging at 1,000° C. The quantified amount of Na was determined by Inductively Coupled Plasma—Optical Emission Spectroscopy.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An oxygen storage material (OSM) comprising;
a zinc manganese iron oxide (ZMF); and
an alkali metal base on at least a portion of a surface of the ZMF,
wherein the alkali metal base is retained on the at least a portion of the surface of the ZMF upon heating to a temperature greater than 1,000° C.

2. The oxygen storage material according to claim 1, wherein the ZMF has a spinel structure and comprises $Zn_xMn_{0.5}Fe_{2-x}O_4$, where x is 0.01 to 0.9.

3. The oxygen storage material according to claim 1, wherein the ZMF has a spinel structure and comprises $Zn_{0.5}Mn_{0.5}Fe_2O_4$.

4. The oxygen storage material according to claim 1, wherein the alkali metal base comprises one or more of lithium carbonate, sodium carbonate, potassium carbonate, rubidium carbonate, and cesium carbonate.

5. The oxygen storage material according to claim 1, wherein the alkali metal base comprises sodium carbonate.

6. The oxygen storage material according to claim 1, wherein the alkali metal base comprises rubidium carbonate.

7. The oxygen storage material according to claim 1, wherein the alkali metal base is about 0.3 to about 2 weight percent of the OSM.

8. The oxygen storage material according to claim 1, wherein the alkali metal base is about one weight percent of the OSM.

9. The oxygen storage material according to claim 1, wherein the OSM displays an $\alpha$-$Fe_2O_3$ surface content.

10. The oxygen storage material according to claim 1, wherein the OSM is stable to temperatures greater than 1,000° C.

11. A method of preparing an oxygen storage material (OSM) comprising a zinc manganese iron oxide (ZMF), the method comprising:
providing an aqueous transition metal ion solution comprising zinc ions, manganese ions, and iron ions;
providing an aqueous alkali metal base solution;
combining the aqueous transition metal ion solution and the aqueous alkali metal base solution;
precipitating an alkali metal containing ZMF with a spinel structure;
isolating the alkali metal containing ZMF as a particulate solid; and
analyzing the alkali metal containing ZMF for a concentration of at least one alkali metal of the alkali metal containing ZMF.

12. The method of preparing an OSM comprising a ZMF according to claim 11, further comprising infusing the alkali metal containing ZMF with an infusing aqueous alkali metal ion solution.

13. The method of preparing an OSM comprising a ZMF according to claim 11, wherein a stoichiometry of the zinc ions to manganese ions to iron ions is x to 0.5 to 2-x, where x is 0.01 to 0.9.

14. The method of preparing an OSM comprising a ZMF according to claim 11, wherein the aqueous alkali metal base solution has a concentration of about 0.8 M to about 3.1 M.

15. The method of preparing an OSM comprising a ZMF according to claim 11, wherein an alkali metal of the aqueous alkali metal base solution is selected from one or more of lithium, sodium, potassium, rubidium, and cesium.

16. The method of preparing an OSM comprising a ZMF according to claim 11, wherein the aqueous alkali metal base solution comprises an alkali metal carbonate solution.

17. A catalytic converter comprising an oxygen storage material (OSM), the OSM comprising:
a zinc manganese iron oxide (ZMF); and
an alkali metal base on at least a portion of a surface of the ZMF, and wherein the alkali metal base is retained on the at least a portion of the surface of the ZMF upon heating to a temperature greater than 1,000° C.

18. The catalytic converter according to claim 17, wherein the ZMF has a spinel structure and comprises $Zn_xMn_{0.5}Fe_{2-x}O_4$, where x is 0.01 to 0.9.

19. The catalytic converter according to claim 17, wherein the alkali metal base comprises one or more of lithium carbonate, sodium carbonate, potassium carbonate, rubidium carbonate, and cesium carbonate.

20. The catalytic converter according to claim 17, wherein the alkali metal base comprises rubidium carbonate.

* * * * *